3,028,244
PROCESS FOR MAKING FLUID SHORTENING

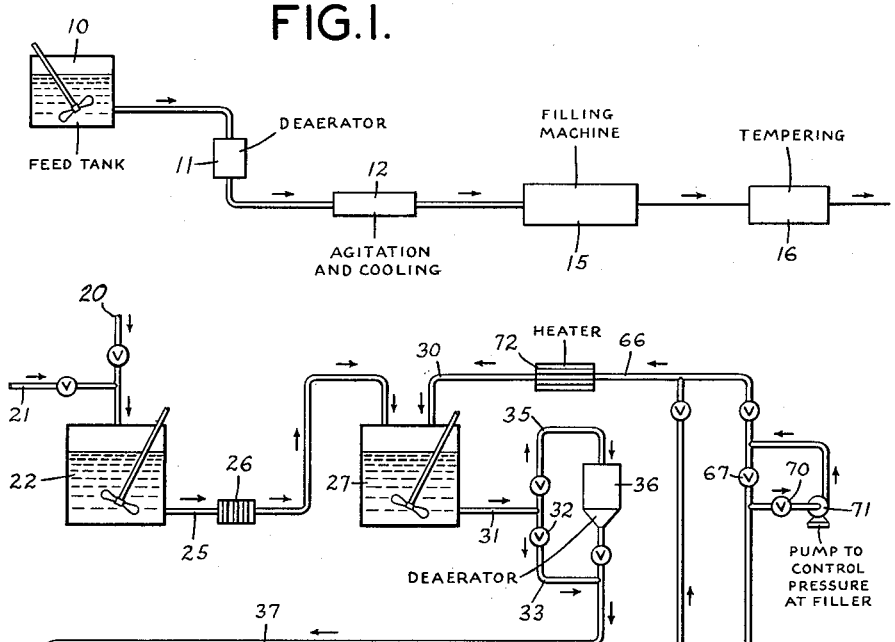
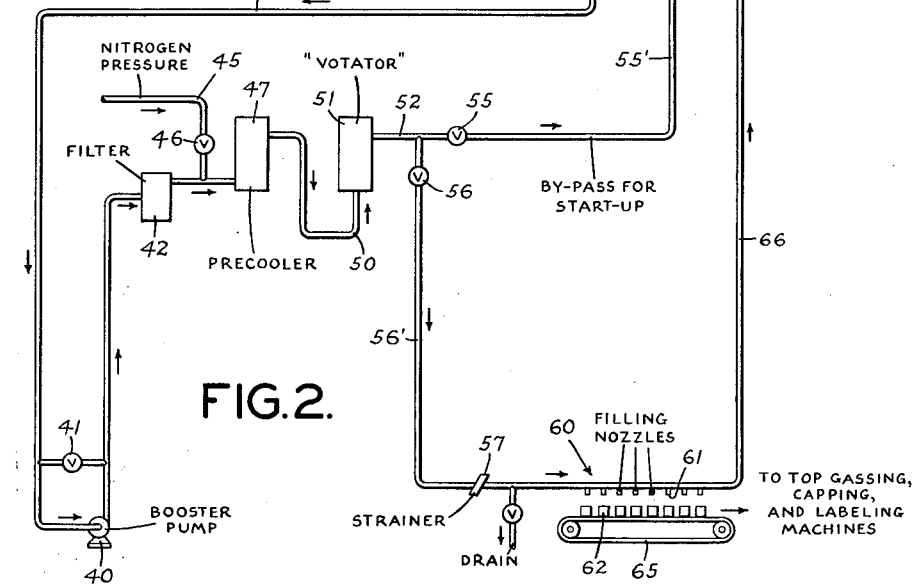

John J. Kearns, Jr., Hasbrouck Heights, N.J., assignor to Lever Brothers Company, New York, N.Y., a corporation of Maine
Filed Mar. 30, 1959, Ser. No. 803,057
7 Claims. (Cl. 99—118)

This application is a continuation-in-part of application Serial No. 649,710, filed April 1, 1957, now abandoned.

This invention relates to a shortening composition for use in baking and frying and to methods of making it, and relates specifically to stable fluid shortening compositions and to the preparation thereof.

Shortenings heretofore available for baking have included natural fats which are solid or plastic at room temperatures, including fatty animal tissues, butter, and lard; compounded or blended shortenings, made from mixtures of naturally hard fats or hydrogenated vegetable oils with liquid, soft, or partially hydrogenated vegetable oils; all-hydrogenated shortenings made by selectively hydrogenating a blend of liquid vegetable oils to obtain the desired finished properties, and superglycerinated shortenings which are generally all-hydrogenated shortenings containing an increased proportion of combined glycerol, in the form of mono- and di-glycerides, primarily mono-glycerides, over that found in ordinary fats.

Liquid oils such as cottonseed, soybean, olive, rapeseed, corn oil, and sunflower seed oil may be treated by a "winterizing" process, known in the prior art to remove ingredients which tend to precipitate and settle out at low temperatures and sometimes cause the oil to congeal. The materials so produced are known as salad oils. Recently liquid oils, particularly salad oils, have been recommended as a shortening for the preparation of a particular variety of cakes, but these oils do not have the cake-baking qualities of other shortenings, including the all-hydrogenated superglycerinated plastic shortening.

In order to improve the cake-baking qualities of liquid oils it has been proposed to add thereto mono-glycerides, di-glycerides or mixtures thereof. However, two of the criteria for a successful liquid shortening are pourability at room temperature (so as to overcome the disadvantage of plastic shortenings that they are not readily measurable), and stability (i.e., solid material should not crystallize and settle out on standing). The concurrent presence of both of these qualities in a shortening is not readily obtained.

Accordingly, one object of the invention is to discover a simple and economical process for producing an acceptable liquid shortening which consists essentially of a mixture of an edible liquid oil and a small amount of mono- and di-glycerides.

Other objects and advantages of the invention will appear from the following description.

In the method of the invention a liquid mixture of an edible oil and about 3 to 5% by weight of a mono-glyceride of at least one 12–20 carbon atom fatty acid or a di-glyceride of such acid or mixtures of such mono- and di-glycerides (which may predominate in either di- or mono-glycerides) at an elevated temperature high enough to maintain the mixture completely liquid is rapidly cooled with vigorous agitation until the temperature of the mixture reaches a point at which some of the normally solid mono- and di-glycerides precipitate in the form of a large number of very small crystal nuclei suspended in the liquid. The mono-glyceride, di-glyceride, or mixtures thereof preferably contain from 0 to 10% of tri-glyceride and a relatively high content of palmitic acid glycerides, i.e., 25–42%. The cooling and the agitation are controlled so that the desired temperature is reached in not greater than 10 minutes, preferably within 60 seconds. The mixture then is permitted to stand or "temper" without agitation for a period of time and within a certain temperature range to permit the mono-, di-glycerides to solidify on the crystal nuclei.

In essence, the process depends on the degree and rate of cooling of the oil blend, and the formation of sufficient nuclei so that as the crystallization is completed during the tempering period the ultimate particle size and shape are such that good fluidity is obtained with a minimum of settling. If the finishing temperature is too low, a viscous product is obtained due to the presence of an excessive number of small crystals and/or crystals of elongated or needle-like shape, whereas if it is too high a coarse-crystallized product results which settles excessively. By following the procedure described herein it has been found that a satisfactory shortening may be prepared which will remain completely liquid and pourable at all normal room temperatures, i.e., 55–95° F., and yet will not separate into liquid and solid phases upon standing for reasonable periods of time. Generally speaking, fluid shortenings within a viscosity range of 1000–6400 c.p.s. show satisfactory performance on storage.

The mono- and/or di-glyceride may be prepared from vegetable oil stearines, such as the stearines of sunflower seed oil, linseed oil, hazelnut oil, soybean oil, peanut oil, olive oil, corn oil, palm oil and lard oil. The fatty acid component of the mono- di-glyceride is preferably the stearyl ($C_{17}H_{35}COO$) group or the palmityl $$(C_{15}H_{31}COO)$$

group, although the mono- di-glyceride mixture of other saturated fatty acids having 12–20 carbon atoms may be used. Thus, a preferred source of the mono- di-glycerides includes cottonseed oil, lard oil and soybean oil because the stearines of the named oils are rich in stearyl glyceride and because they contain a relatively high content of palmityl glyceride. It has been found that a palmityl glyceride content of from 25–42% in a mono- and/or di-glyceride composition of this invention is preferred. Cottonseed winter oil stearine, which is the residue from the manufacture of cottonseed salad oil, is pressed (I.V. 90–95) and upon hydrogenation yields a suitable stearine for use in the preparation of the mono-, di-glyceride combination. These compositions contain about 35% of palmityl glyceride. Emulsifiers obtained from lard contain about 25–26% of palmityl glyceride and are also preferred compositions. The mono- di-glycerides or the oils from which they are derived are preferably hydrogenated to an iodine value of 30 or less.

Any liquid vegetable oil may be used as a base, including cottonseed, soybean, corn, olive and peanut among other oils, as well as slightly hydrogenated liquid variations thereof.

The copending application of Werner H. Schmidt which was filed August 31, 1956, Serial No. 607,290, now abandoned, described an improved fluid shortening comprising an edible liquid oil and about 3 to 4% by weight of a mixture of mono- and di-glycerides of at least one 12–20 carbon atom fatty acid having a weight ratio of di-glyceride to monoglyceride of at least 1:1 and not greater than 3:1. A continuation-in-part of this application, Serial No. 851,250, setting forth further developments in this area has been filed. These further developments include the requirements that the emulsifier element of the liquid shortening have a low content of tri-glyceride in the range of 0 to 10% and a high content of palmitic acid glycerides, i.e., in the range of 25–42%. The mixture of mono- and di-glyceride may be prepared by procedures exemplified in detail in the Schmidt applications from vegetable oil stearines, e.g., by manufacturing or by purchasing each of the ingredients separately and mixing them in the desired ratio, or by employing a glycerination and subsequent deglycerination technique beginning with the stearine of one of the oils of the fatty acids of the 12-20 carbon atom group as described in the Schmidt patent application.

To prepare the fluid shortening described in the Schmidt application, the base oil and the mono-, di-glyceride mixture are mixed and heated to a temperature at which the system is fluid, e.g., 130-160° F. For small-scale batch operation, that is, batches of about 3 pounds, the blend is allowed to cool by standing in a room at 70° F. for about 16 hours. Thereafter the batch is homogenized at 70° F. and further "conditioned" by standing without agitation at 70° F. for about 24 hours. However, for large scale operation the batchwise cooling method described in the Schmidt application has disadvantages since cooling periods are unduly long, the problem of temperature control is difficult, and the need for control complicates the operation. One advantage of my invention is the provision of a simple and economical process for producing the fluid shortening described in the Schmidt patent application Serial No. 607,290 and its continuation-in-part, Serial No. 851,250.

In my method the conditions which have been found necessary for the production of a satisfactory fluid shortening can advantageously be maintained in a continuous operation wherein the completely liquid mixture of edible oil and mono- and di-glycerides is fed to an elongated cooling zone provided with means to agitate the mixture vigorously. The rate of flow of the mixture and the amount of heat removed therefrom in the zone are controlled so that the temperature of the effluent, which is continuously withdrawn from the zone, the residence time of the mixture in the zone and the tempering of the effluent are as described above. The rapid chilling of the mixture in the elongated cooling zone produces a super-cooling effect so that the mono-, di-glycerides form crystal nuclei suspended in the liquid on which the crystals grow during the tempering period.

The type of continuous cooler employed is preferably a relatively narrow elongated tube having an inlet adjacent one end and an outlet adjacent the other end and jacketed for a cooling medium. Agitation means such as rotating vanes or blades which closely approach the inner walls of the tube so as to produce maximum shearing effect are provided. One such type of apparatus for producing simultaneous agitation and cooling is known as a "Votator" and is described in the United States Patent No. 1,783,864.

The inlet temperature of the mixture will depend to some extent upon the composition of the material, the object being to maintain it completely in the liquid phase without any discrete solid particles of mono- or di-glyceride therein. Temperatures in the range 115 to 170° F. may be found to be suitable for the purpose.

The intensity of the agitation and the amount of cooling produced by the cooling medium are coordinated with each other so that the desired objective of rapid super-cooling is achieved. As stated above, the cooling time is not greater than 10 minutes. However, in a continuous cooler, such as a "Votator," residence times of material in the cooling zone of about 15 seconds to 2 minutes may be used effectively. Preferably the residence time and the time for cooling the material to the temperatures indicated should be not greater than 60 seconds.

The factor which determines the desired outlet temperature of the material from the cooler as previously suggested is the production of small crystalline nuclei upon which the mono-, di-glycerides may crystallize. With this purpose in mind the outlet temperature is generally maintained below about 95° F. However, the temperature of the cooled mixture is to a degree dependent upon the content of the normally solid mono- and di-glycerides and hence generally, for mixtures having larger amounts thereof, within the range stated above, the temperature to which the mixture is cooled will approach and may be even slightly higher than 95° F. On the other hand, the temperature is high enough to avoid the precipitation of an excessive amount of the mono-, di-glycerides, the purpose being to retain the major portion thereof in supersaturated solution so that it may contribute to crystal growth during the tempering period. Hence, for compositions having 3-4% of mono-, di-glycerides the cooler exit temperature is preferably below 90° F. but not lower than about 80° F.

A convenient way of controlling the outlet temperature is to maintain it at about 2 to 10° F. below the temperature at which visible crystals appear in the fluid, preferably 2 to 5° F. below such temperature. Thus, the desired balance between crystal nuclei formation and crystal growth is obtained so as to produce a shortening having the desired fluidity plus stability.

Tempering may be brought about by standing from 16 to 48 hours or more at a temperature within about 11° F. of the cooler exit temperature. However, preferred results can be obtained if the tempering temperature is closely controlled to within about 2° F. of the exit temperature.

The invention will be described by reference to the appended drawings in which:

FIGURE 1 is a general schematic flow diagram of the process;

FIGURE 2 is a more detailed schematic flow diagram of the process of the invention and apparatus used in connection therewith.

Referring to FIGURE 1, the liquid edible oil and the mono-, di-glyceride additive are mixed and heated in a feed tank shown schematically at 10. From the tank 10 the completely fluid mixture passes through a deaerator 11 and thereafter through an agitated cooling vessel 12. From the cooling vessel the cooled mixture passes to a filling machine 15 and thence to a storage room for tempering at 16.

A more detailed illustration of an apparatus and method for carrying out the invention is shown in FIGURE 2 in which preheated deodorized cottonseed oil may be supplied through the pipe 20, and the heated and liquefied mono-, di-glyceride additive may be supplied through the pipe 21 to the mixing tank 22. From the tank 22 the mixture, which is completely liquid, is passed through the filter 26 to remove suspended solid impurities and is introduced into the tank 27 where it is mixed with other material recycled from the filling apparatus through the pipe 30. In the tank 27 the mixture is agitated and continuously withdrawn from the tank through the pipe 31. The valve 32 will generally be closed, thereby preventing the flow of material through the bypass pipe 33 and forcing the material to flow through the pipe 35 into the deaerator 36 where any air entrapped in the liquid in the tanks 22, 27 or the connecting pipe is removed. The pipe 37 conveys the material to the booster pump 40 (the bypass valve 41 being normally closed) which supplies the pressure necessary to force the liquid through the filter 42. Nitrogen gas is supplied through the pipe 45 and the valve 46 in order to provide an oxygen-free blanket and to prevent the occlusion of air in the material during the subsequent processing steps and storage. In the precooler 47 the temperature of the liquid mixture is partially reduced, that is, to a point above that at which it is desired to feed the material into the "Votator." From the precooler 47 the mixture, which is still completely liquid, passes through the pipe 50 into the "Votator" 51 which is an elongated, agitated cooling vessel described in greater detail above. After the temperature of the mixture has been reduced to the desired degree in the "Votator" the liquid material, containing some of the mono-, di-glyceride mixture additive precipitated as fine crystals or "seeds," is withdrawn through the pipe 52. The valve 55 will normally be closed, thus preventing the flow of material through the bypass pipe 55'. The valve 56, however, will normally be open, thus permitting the material to flow through the pipe 56' and the strainer 57 to the filling mechanism indicated generally at 60. At the filling mechanism the mixture passes through the filling nozzles 61 into the open-top containers 62 which are supported on a continuously moving belt 65. The filled containers are removed from the belt and are carried away to machinery not shown, which applies an inert gas under pressure to the space above the material in the container and caps and labels the containers. Thereafter, the closed containers are stored at a temperature heretofore described to "temper" the material and thereby produce the properties which are desired in the product.

The excess quantity of mixture which is not passed through the filling nozzles 61 is returned through the pipe 66 to the mixing tank 27. The valve 67 will be normally closed and the valve 70 normally open, thereby directing the flow of material through the pump 71, which serves to control the pressure of the fluid material at the filling station 60. The recycled material is reheated at 72 before it is introduced into the mixing tank 27 through the pipe 30.

The following examples are presented as illustrations of the invention, but are not limitations thereon.

EXAMPLE 1

A mixture of mono- and di-glycerides was prepared from cottonseed winter oil stearine hydrogenated to an iodine value of 1 by the esterification de-esterification procedure described in the Schmidt application Serial No. 607,290, and its continuation-in-part, Serial No. 851,250. The mono-, di-glyceride mixture contained approximately 30% mono-glycerides, 65% di-glycerides and 5% tri-glycerides by weight. 3.5% of the additive was mixed with 96.5% of liquid cottonseed oil and the mixture was heated to 167° F. to liquefy the material. The heated material was continuously fed to and continuously withdrawn from a "Votator A" having a cooling area of 88 square inches at the rate of 500–550 pounds per hour, the inlet temperature being 122 to 167° F. The residence time of the material in the "Votator A" was 17.5 seconds. At this residence time and while subjecting the material in the "Votator A" to vigorous agitation, the outlet temperature of the material was controlled to 86–89.6° F. by controlling the ammonia suction pressure at the "Votator A" to 15 to 45 p.s.i. gauge. The product was tempered by holding it without agitation at the exit temperature for 1–2 days. The product was a stable substantially non-settling fluid shortening which had acceptable baking characteristics as described in the Schmidt patent application Serial No. 607,290 and its continuation-in-part, Serial No. 851,250. It was determined by microscopic examination of the product that the crystals therein were elongated having dimensions in the range 2.5 to 15 microns long by 1 to 5 microns in the other dimensions.

EXAMPLE 2

The completely melted mixture of liquid cottonseed oil and the mixture of mono- and di-glycerides described in Example 1 was treated in a "Votator A" unit having a larger capacity and a cooling area of 1090 square inches. The rate of feed (continuous) of the melted material to the agitated cooler was 7000–8500 pounds per hour, providing residence time of the material within the cooler of 60 seconds. The inlet temperature was 136–144° F. and the exit temperature of the product was maintained within the range 85–88° F. by controlling the ammonia ammonia suction pressure in the "Votator A" within the range 5–25 pounds per square inch gauge. The product, which was continuously withdrawn from the "Votator A" was tempered at the exit temperature for 1–2 days to produce a stable fluid substantially non-settling shortening which had the acceptable baking characteristics described in the aforesaid Schmidt applications.

EXAMPLE 3

The procedure described in Examples 1 and 2 was substantially repeated using a composition consisting of 1% of a 1:1 mixture of partially hydrogenated di-, mono-glycerides from cottonseed oil, 1.0% of a 2:1 mixture of di-, mono-glycerides from soybean oil stearine (1 I.V.), 3% of a 2:1 mixture of di-, mono-glycerides from cottonseed winter oil (1 I.V.) and 95% liquid cottonseed oil (108 I.V.). The pressure of the ammonia in the cooling jacket was 45 pounds per square inch. The temperature of the effluent and at which the effluent was tempered was 97° F. The product, which was a substantially stable non-settling fluid shortening, had a viscosity of 2160 c.p.s.

EXAMPLE 4

Samples of fluid shortening were prepared using 3% and 5% emulsifier (one part of mono-glyceride to two parts of di-glyceride) in liquid cottonseed oil. Each of the emulsifier constituents were prepared from 1 I.V. cottonseed winter oil stearine containing about 35% of $C_{16}$ and 62–63% of $C_{18}$ fatty acids. Each sample was chilled to a pack temperature of about 10° F. below its incipient crystallization point. Portions of each lot were then tempered at the pack temperature, as well as at about 10° F. above and below this temperature. After 40 hours, all of the samples were moved to 70° F. Viscosity determinations were made on the samples after 48 hours at 70° F. Table 1 below summarizes these results.

Table 1

EFFECT OF TEMPERING ON FLUID SHORTENINGS

| Composition | Incipient Crystal. Point | Pack Temp. | Cooling Time, mins. | Tempering Temp., °F. | Viscosity at 70° F., c.p.s. |
| --- | --- | --- | --- | --- | --- |
| 0.90% mono-glycerides<br>1.95% di-glycerides<br>0.15% tri-glycerides<br>97.00% liquid cottonseed oil | 87.5° F. (30.8° C.) | 77.9° F. (25.5° C.) | 4.0 | 70<br>80<br>90 | 1,825<br>1,250<br>700 |
| 1.50% mono-glycerides<br>3.25% di-glycerides<br>0.25% tri-glycerides<br>95.00% liquid cottonseed oil | 98.3° F. (36.8° C.) | 89.1° F. (31.7° C.) | 3.5 | 80<br>90<br>100 | 5,700<br>4,220<br>2,080 |

Fluid shortenings within a viscosity range of 1000–6400 c.p.s. show satisfactory performance on storage. All of the above samples fall in the accepted range with the exception of the product containing 3% emulsifier tempered at 90° F. This product was tempered above the 11° F. limit and was consequently below the viscosity limit.

EXAMPLE 5

The fluid shortening had the following formulation:

Percent
Normal liquid cottonseed oil, 108 I.V. _____ 96.5
Mono- and di-glycerides (1:2 ratio) from hydrogenated cottonseed winter oil stearine, 1 I.V. ____ 3.5

Three series of tests were carried out which are summarized in Tables 2, 3 and 4, respectively, hereinafter. In series No. 1, the mixtures were heated to 140° F. at which temperature they were completely liquid. They were then cooled to 87° F. by a variety of procedures at different rates. In some of the tests, the material was stirred by hand. They were held at the final temperature (±2° F.) for 2 days without agitation. In two other tests, the material was cooled by passing it through a "Votator." In still other tests, the material was cooled in the larger size "Votators." At the end of the tempering period, observations were made of the amount of clear liquid that appeared at the top of the sample due to settling of the suspended solids. These results appear in Table 2 under the heading "Separation."

*Table 2*

EFFECT OF COOLING RATE ON SEPARATION OF FLUID SHORTENINGS

| Test No. | Type | Coolant Temp. °F. | Cooling Time | Separation |
|---|---|---|---|---|
| 1 | Hand Stirring—60 r.p.m. | 85.5 | 13 mins | 14%. |
| 2 | Hand Stirring—60 r.p.m. | 76.5 | 8.5 mins | 1%. |
| 3 | Hand Stirring—150 r.p.m. | 76.5 | 5.0 mins | nil. |
| 4 | Hand Stirring—60 r.p.m. | 34 | 2.25 mins | nil. |
| 5 | "Mini Votator" | 85.0 | 11 mins | 5%. |
| 6 | do | 72.5 | 4.8 mins | nil. |
| 7 | Pilot Plant "Votator" | 32 | 17.5 secs | nil. |
| 8 | Plant "Votator" | 0 | 60 secs | nil. |

As can be seen from the data in Table 2, products cooled slowly to the final temperature, i.e., less than 5 to 6° F. per minute, separated more on standing than those which were cooled rapidly.

In series No. 2 the effect of the "tempering" temperature on the viscosity of the product was determined. In each case the product was cooled in the plant "Votator" in about 60 seconds to a temperature of 87° F. Thereafter, it was tempered at 70° F., 90° F. or 105° F. for various times. The viscosities and the degrees of separation of the tempered product were measured and are reported in Table 3.

*Table 3*

EFFECT OF TEMPERING ON VISCOSITY OF FLUID SHORTENINGS

| Test No. | Temp. °F. | Tempering Time | Viscosity at 70° F. | Separation |
|---|---|---|---|---|
| 1 | 70 | 1 day | Not fluid | nil. |
| 2 | 70 | 2 days | do | nil. |
| 3 | 70 | 5 days | do | nil. |
| 4 | 90 | 16 hours | 8,400 c.p.s. | nil. |
| 5 | 90 | 2 days | 4,800 c.p.s. | nil. |
| 6 | 90 | 5 days | 4,780 c.p.s. | nil. |
| 7 | 105 | 16 hours | | 20% free oil. |
| 8 | 105 | 2 days | | 40% free oil. |

The data in Table 3 show that products which were placed directly at 70° F. for tempering after cooling became stiff, and did not become sufficiently fluid despite holding them for periods up to five days. The products which were tempered at 105° F., on the other hand, separated excessively and were objectionable from this standpoint. The products obtained in tests 5 and 6 were satisfactory. The product in test No. 4, while more viscous than desirable, was still pourable.

In series No. 3 the same procedure was followed as in series No. 2 except that the samples in every case were tempered within 2° F. of the final cooler outlet temperature and the cooler outlet temperature was varied by varying and controlling the temperature of the coolant. The temperature at which crystal nuclei began to appear in the product was 91.5° F. The results are presented in Table 4.

*Table 4*

| Test No. | Pack Temp., °F. | Viscosity at 70° F on Tempered Product c.p.s. | Separation after 3 days at 105° F. percent |
|---|---|---|---|
| 1 | 83.0 | 6,350 | <1 |
| 2 | 86.0 | 4,700 | <1 |
| 3 | 88.5 | 3,280 | 1 |
| 4 | 91.0 | 1,050 | 15 |

After the samples were tempered, they were stored for 3 days at 105° F. as a test of their stability. The results show that the cooler effluent temperature is very important from the standpoint of obtaining a stable product. The product of test No. 4 was unacceptable because of excessive settling. The product of test No. 1 was stiffer than desired although still pourable.

Although the details of the proposed invention have been described herein it is evident that many modifications and equivalents will be apparent to those skilled in the art. Accordingly, it is intended that all such modifications and equivalents be included within the scope of the appended claims.

I claim:

1. The process for preparing a liquid shortening which comprises cooling a liquid mixture of an edible liquid oil and about 3–5% by weight of a material of the group consisting of mono- and di-glycerides of 12–20 carbon atom fatty acids and mixtures thereof from an elevated temperature high enough to maintain said mixture completely liquid to a temperature about 2 to 10° F. below the temperature at which visible crystal nuclei appear therein while controlling the time required to cool the mixture to said temperature to not greater than ten minues, said time and temperaure being further controlled to produce a sufficient number of crystal nuclei to produce a fluid stable shortening, and thereafter tempering said cooled mixture without substantial agitation at a temperature within about 11° F. of the temperature of said cooled mixture for at least about sixteen hours in order to permit said crystal nuclei to grow into larger crystals and thereby produce a stable liquid shortening composition.

2. The process of preparing a liquid shortening which comprises continuously introducing a liquid mixture of an edible liquid oil and about 3–5% by weight of a material of the group consisting of mono- and di-glycerides of 12–20 carbon atom fatty acids and mixtures thereof at an elevated temperature high enough to maintain the mixture completely liquid, into one end of an elongated cooling zone, passing said mixture through said cooling zone while vigorously agitating and cooling said mixture in said zone, continuously withdrawing said mixture from the opposite end of said zone, controlling the rate of flow of said mixture through said zone and the amount of heat removed therefrom in said zone so that the temperature of the effluent is about 2 to 5° F. below the temperature at which visible crystal nuclei appear therein and the time required to cool the mixture to the effluent temperature is not greater than 2 minutes, and thereafter tempering said cooled mixture without substantial agitation at a temperature within about 11° F. of the temperature of said cooled mixture for at least about sixteen hours in order to permit said crystal nuclei to grow into larger crystals and thereby produce a stable liquid shortening composition.

3. The process of claim 1 wherein the temperature of the cooled mixture is not below about 80° F.

4. The process of claim 1 where said tempering temperature is within about 2° F. of the cooler exit temperature.

5. The process of claim 1 wherein the temperature of the material entering the cooling zone is in the approximate range 115–170° F.

6. The process of claim 2 wherein the temperature of the cooled mixture is not below about 80° F.

7. The process for preparing a liquid shortening which comprises continuously introducing a liquid mixture of an edible oil and about 3–4% by weight of a material of the group consisting of mono- and di-glycerides of 12–20 carbon atom fatty acids and mixtures thereof at a temperature in the approximate range 115–170° F. into one end of an elongated coolign zone, passing said mixture through said cooling zone while vigorously agitating said mixture in said zone, continuously withdraw- into one end of an elongated cooling zone, passing said controlling the rate of flow of said mixture through said zone and the amount of heat removed therefrom in said zone so that the temperature of the effluent is in the approximate range 80–90° F. and low enough to cause the formation of a substantial number of crystal nuclei of said material and the residence time of the mixture in said zone is not greater than two minutes, and thereafter tempering said cooled mixture by holding it without substantial agitation at a temperature within about 2° F. of the cooler exit temperature.

References Cited in the file of this patent

UNITED STATES PATENTS 2,815,286    Andre et al. _____ Dec. 3, 1957

UNITED STATES PATENT OFFICE
CERTIFICATE OF CORRECTION

Patent No. 3,028,244                                        April 3, 1962

John J. Kearns, Jr.

It is hereby certified that error appears in the above numbered patent requiring correction and that the said Letters Patent should read as corrected below.

Column 6, line 9, strike out "ammonia"; line 40, for "temepered" read -- tempered --; column 7, line 13, for "soilds" read -- solids --; column 9, line 9, for "coolign" read -- cooling --; line 12, for "into one end of an elongated cooling zone, passing said" read -- ing said mixture from the opposite end of said zone, --.

Signed and sealed this 10th day of July 1962.

(SEAL)
Attest:

ERNEST W. SWIDER                                            DAVID L. LADD
Attesting Officer                                                Commissioner of Patents